United States Patent [19]

Yoshida et al.

[11] Patent Number: 4,932,238
[45] Date of Patent: Jun. 12, 1990

[54] CONTROL SYSTEM AND METHOD FOR CONTROLLING PLANT HAVING HIGH ORDER LAG

[75] Inventors: Hideji Yoshida, Hashima; Nobuhiro Hayakawa, Chita; Akio Mizutani; Tessho Yamada, both of Nagoya, all of Japan

[73] Assignee: NGK Spark Plug Co., Ltd., Nagoya City, Japan

[21] Appl. No.: 247,344

[22] Filed: Sep. 21, 1988

[30] Foreign Application Priority Data

Sep. 25, 1987 [JP] Japan .................................. 62-242015

[51] Int. Cl.$^5$ ............................................. G01N 27/12
[52] U.S. Cl. ......................................... 73/23.2; 73/116
[58] Field of Search ..................... 73/23, 26, 116, 118.1

[56] References Cited

U.S. PATENT DOCUMENTS

| | | | |
|---|---|---|---|
| 4,033,170 | 7/1977 | Kawamura et al. | ..................... 73/23 |
| 4,298,573 | 11/1981 | Fujishiro | ........................... 73/26 X |
| 4,570,479 | 2/1986 | Sakurai et al. | ...................... 73/23 X |
| 4,796,587 | 1/1989 | Nakajima et al. | .................. 73/23 X |
| 4,803,866 | 2/1989 | Miki et al. | .............................. 73/23 |

FOREIGN PATENT DOCUMENTS 62-15451  1/1987  Japan .

Primary Examiner—Jerry W. Myracle
Assistant Examiner—Joseph W. Roskos
Attorney, Agent, or Firm—Foley & Lardner, Schwartz, Jeffery, Schwaab, Mack

[57] ABSTRACT

A control system has a controlled element, such as an element for sensing an air/fuel ratio of an internal combustion engine, having a high order lag, a controller element connected with the controlled element to form a closed path, and a third element connected with the controlled element and controller element for modifying an output signal of the controlled element in accordance with an output signal of the controller element so that a phase angle in a frequency response of a loop transfer function of the controlled and controller elements does not reach $-180°$.

5 Claims, 4 Drawing Sheets

FIG. 5
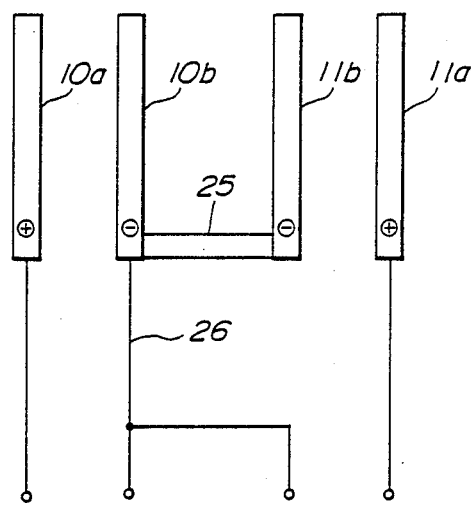
FIG. 6 *(PRIOR ART)*
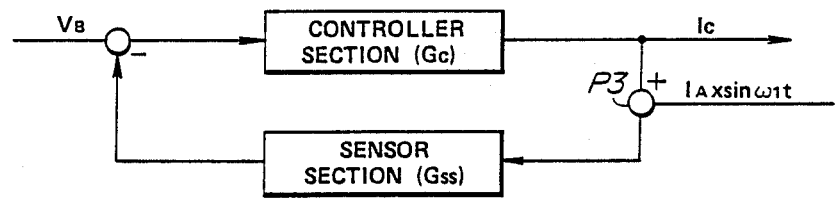
FIG. 7 *(PRIOR ART)*
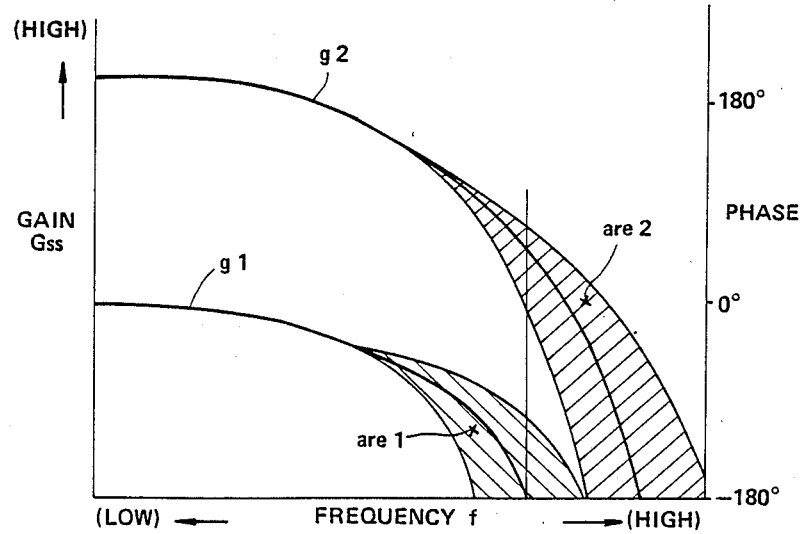

FIG. 8
*(PRIOR ART)*
(A)
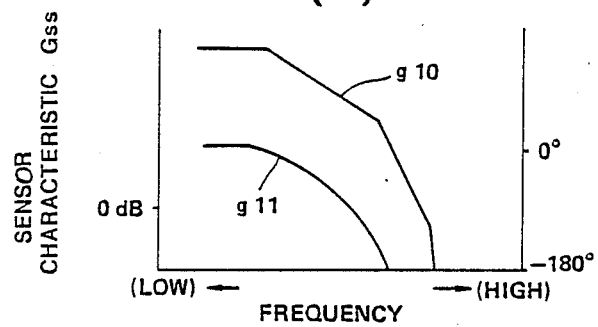
(B)
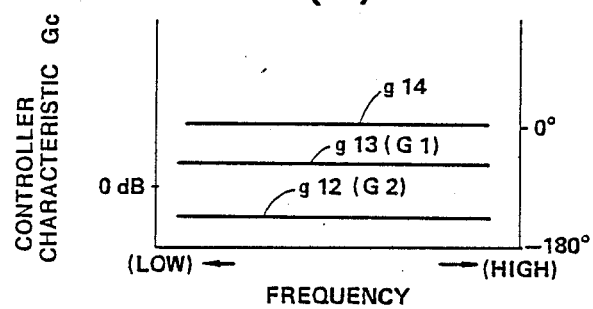
(C)
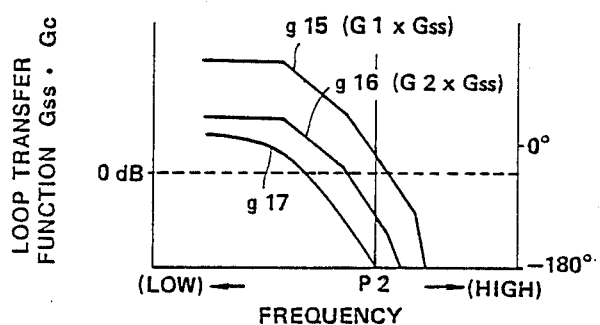

CONTROL SYSTEM AND METHOD FOR CONTROLLING PLANT HAVING HIGH ORDER LAG

BACKGROUND OF THE INVENTION

The present invention relates to apparatus and method for controlling a controlled system, or plant, such as an air/fuel ratio sensor for sensing an air/fuel ratio of an engine of a motor vehicle.

There has been proposed various air/fuel ratio sensing systems (Japanese patent provisional publication No. 62-15451, for example). In one conventional example, there are provided two sensing elements each of which is composed of an oxygen ion conductive solid electrolyte plate sandwiched between a pair of electrodes of porous material. This conventional air/fuel ratio sensing device uses one of the sensing elements as an oxygen concentration cell element, and the other as an oxygen pump element, and outputs an air/fuel ratio signal corresponding to the oxygen concentration of an exhaust gas mixture acting as a disturbance.

FIG. 6 schematically shows this conventional air/fuel ratio sensing device. This device includes a sensor section for sensing an air/fuel ratio, and a controller section for controlling the sensor section. The sensor section has a transfer function Gss, and the controller section has a transfer function Gc. In FIG. 6, $V_B$ is a voltage of the oxygen concentration cell element, and $I_C$ is a pump current. A current $IA \times \sin \omega_1 t$ corresponding to the oxygen concentration of the engine exhaust gas mixture is applied as a disturbance to a junction point P3 between an output terminal of the controller section and an input terminal of the sensor section.

FIG. 7 is a Bode diagram for the sensor section. Because the sensor section has a high order lag, the conventional air/fuel ratio sensing device tends to become unstable. The control system oscillates if the gain of the frequency characteristic for a loop transfer function $Gc \times Gss$ of the controlled system and the controller is greater than zero dB at the frequency at which the phase angle is $-180°$ (phase leg). Three Bode diagrams (A), (B) and (C) in FIG. 8 shows frequency characteristics for the transfer function Gss of the sensor section, the transfer function Gc of the controller section, and the loop transfer function $Gss \times Gc$ of the conventional system. In the Bode diagram (A) of FIG. 8, g10 is a gain line, and g11 is a phase line for the sensor section. In the Bode diagram (B), a graph g13 is a gain line obtained when the gain of the controller section is equal to G1, and G12 is a gain line obtained when the gain is equal to G2. A graph g14 is a phase line for the controller section. The Bode diagram (C) shows a gain line g15 for the loop transfer function $G1 \times Gss$, a gain line g16 for the loop transfer function $G2 \times Gss$, and a phase line g17. The gain of g16 is equal to or lower than zero dB at a point P2 at which the phase angle of the loop transfer function $Gss \times Gc$ reaches $-180°$. Therefore, the control system is stable when the gain of the controller section is set equal to G2.

However, it is difficult to set the controller gain at such an appropriate value as to prevent oscillation especially in the air/fuel ratio sensing device in which the sensor characteristic Gss is greatly influenced by the ambient atmosphere and the sensor temperature, and parameter identification is difficult. In the Bode diagram of FIG. 7, g1 is a phase line and g2 is a gain line.

The phase and gain of the sensor section are varied by the ambient atmosphere and the sensor temperature as shown by hatched areas, are 1 and are 2 in FIG. 7, respectively. The influences are remarkable especially in a high frequency range.

SUMMARY OF THE INVENTION

It is an object of the present invention to provide a control system which can prevent oscillation with a simple arrangement, and provide stable control performance even when a controlled system has a high order lag, as in an air/fuel ratio sensing system.

According to the present invention, a control system comprises a controlled element having a lag, a controller element, and leakage means. The controlled element has input and output terminals. The controller element has an input terminal connected with the output terminal of the controlled element, and an output terminal connected with the input terminal of the controlled element. The leakage means causes a predetermined amount determined from an input signal of the controlled element to leak to an output signal of the controlled element so as to prevent a phase lag in a frequency characteristic of a loop transfer function of the controlled element and the controller element from becoming equal to greater than 180° in an entire frequency range. The thus-constructed control system of the present invention does not oscillate even when the gain of the transfer function is made equal to or higher than zero dB.

BRIEF DESCRIPTION OF THE DRAWINGS

FIG. 5 is a diagram of an equivalent circuit similar to FIG. 2, but showing another embodiment.

FIG. 6 is a block diagram showing a conventional air/fuel ratio sensing system.

FIG. 7 is a Bode diagram for a sensor section of the conventional air/fuel ratio sensing system.

FIG. 8 shows three Bode diagrams for sensor characteristic Gss, controller characteristic Gc and loop transfer function $Gss \times Gc$ of the conventional air/fuel ratio sensing system.

DETAILED DESCRIPTION OF THE INVENTION

Figure 1:
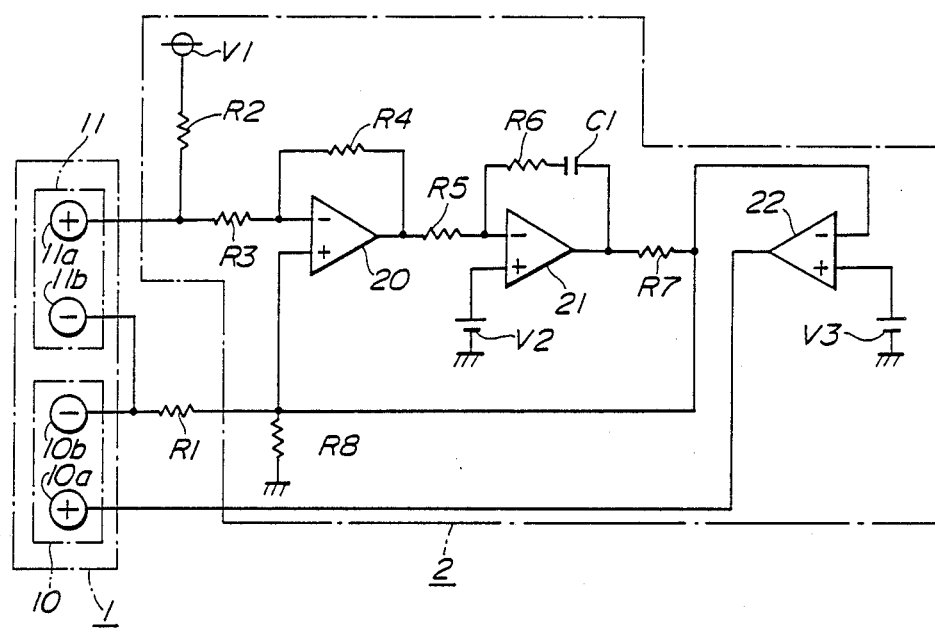
FIG. 1 is a circuit diagram showing an air/fuel ratio sensing system according to the present invention.

FIG. 1 shows an air/fuel ratio sensing system according to one embodiment of the present invention.

The system shown in FIG. 1 includes a sensor section 1 for sensing an air/fuel ratio of an exhaust gas mixture of a vehicular engine, a controller section 2 for producing a controller output signal representing the air/fuel ratio, and a third section which comprises a leakage resistor R1 for causing a predetermined amount determined from an input signal of the sensor section to leak to an output signal of the sensor section.

The sensor section 1 includes first and second sensing elements 10 and 11, each of which comprises an oxygen ion conductive solid electrolyte plate. The first sensing element 10 is operated as an oxygen pump element by the controller section 2. The second sensing element 11 is operated as an oxygen concentration cell element by the controller section 2.

The controller section 2 includes three operational amplifiers 20, 21 and 22, seven resistors R2, R3, R4, R5, R6, R7 and R8, a capacitor C1 and three reference power sources V1, V2 and V3.

As shown in FIG. 1, a series combination of R2 and R3 is connected between the first source V1 and an inverting input terminal of the first operational amplifier 20. A positive electrode 11a of the oxygen concentration cell element 11 is connected to a branch point lying between R2 and R3. The resistor R4 is connected between the inverting terminal and an output terminal of the first operational amplifier 20. The output terminal of the first operational amplifier 20 is connected through the resistor R5 to an inverting input terminal of the second operational amplifier 21. The resistor R6 is connected between the inverting terminal and an output terminal of the second operational amplifier 21. The capacitor C1 is interposed between R6 and the output terminal of the operational amplifier 21. The output terminal of the second operational amplifier 21 is connected through R7 to an inverting terminal of the third operational amplifier 22. A noninverting terminal of the first operational amplifier 20 is grounded through R8. A branch point between the noninverting terminal of the first operational amplifier 20 and the resistor R8 is connected through R1 to a negative electrode 10b of the oxygen pump element 10, and to a branch point lying between the resistor R7 and the inverting terminal of the third operational amplifier 22. The second source V2 is connected between a noninverting terminal of the second operational amplifier and the ground. The third source V3 is connected between a noninverting terminal of the third operational amplifier 22 and the ground. The output terminal of the third operational amplifier 22 is connected to a positive electrode 10a of the oxygen pump element 10.

The controller section 2 ouputs the air/fuel ratio signal representing the oxygen concentration of the ambient atmosphere in accordance with a voltage Vs developed by the oxygen concentration cell element 11 and a current Ip (hereinafter referred to as a pump current) which flows through the oxygen pump element 10. At the same time, the controller section 2 functions to make the air/fuel ratio closer to a predetermined air/fuel ratio value by operating the oxygen pump element 10.

Figure 2:
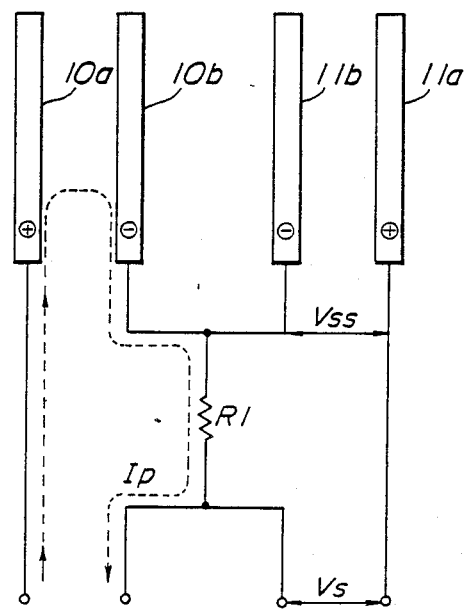
FIG. 2 is a diagram of an equivalent circuit for showing a relation between a voltage Vs and a voltage Vss.

As seen from the equivalent circuit of FIG. 2, the voltage Vs produced by the oxygen concentration cell element 11, that is the voltage between the positive electrode 11a of the oxygen concentration cell element 11 and the ground's side of the leakage resistor R1, can be expressed as;

$$Vs = Vss + R1 \times Ip \quad (1)$$

where Vss is a voltage between the positive and negative electrodes 11a and 11b of the oxygen concentration cell element 11. In this embodiment, the resistance of the leakage resistor R1 is several ohms.

Figure 3:
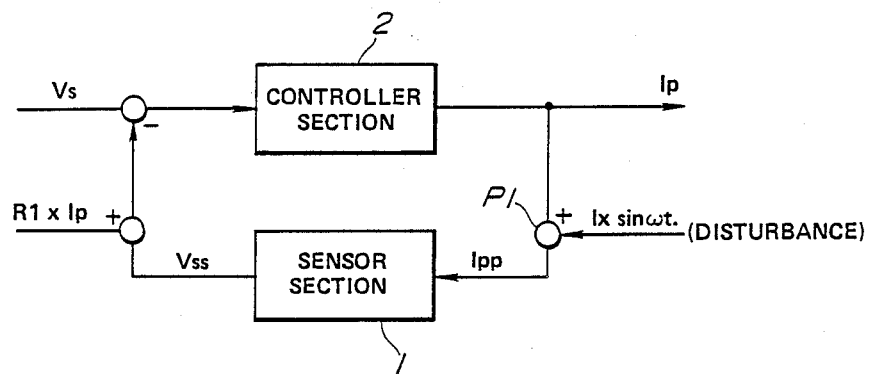
FIG. 3 is a block diagram showing the air/fuel ratio sensing system of FIG. 1.

FIG. 3 shows the air/fuel ratio sensing system of this embodiment in the form of a block diagram. In FIG. 3, a current $I \times \sin \omega t$ is a disturbance corresponding to the air/fuel ratio of the ambient atmosphere. This disturbance is inputted into a point P1 between the output terminal of the controller section 2, and the input terminal of the sensor section 1.

The transfer function Gs determined by the sensor section 1 of this embodiment is expressed as;

$$\begin{aligned} Gs &= \log(\Delta Vs/\Delta Ip) \\ &= \log[(\Delta Vss + R1 \times \Delta Ip)/\Delta Ip] \\ &= \log[(\Delta Vss/\Delta Ip) + R1] \end{aligned}$$

where $\Delta Vs$ is a variation of the voltage Vs, and $\Delta Ip$ is a variation of the pump current Ip.

Therefore, the transfer function Gs of the sensor section 1 is given as follows:
In a low frequency range;

$$\begin{aligned} Gs &= \log(\Delta Vss/\Delta Ip) \\ &= Gss \end{aligned}$$
$(\because \Delta Vss/\Delta Ip >> R1)$ In a high frequency range;

$$Gs = \log(R1)$$

$(\because \Delta Vss/\Delta Ip << R1)$

Figure 4:
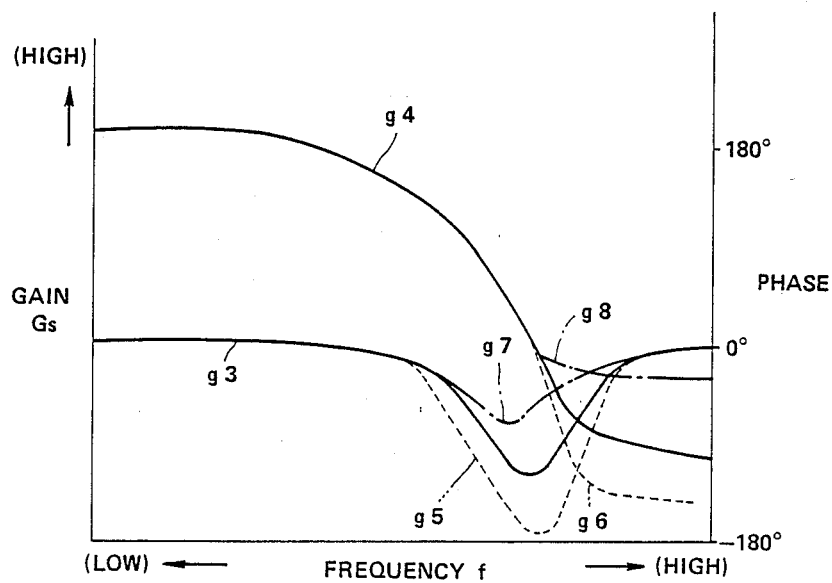
FIG. 4 is a Bode diagram showing characteristics of the air/fuel ratio sensing system of FIG. 1.

Therefore, the air/fuel ratio sensing system of this embodiment provides a frequency characteristic as shown by a gain line g4 and a phase line g3 in a Bode diagram of FIG. 4. In the equation, Gss is the transfer function of the sensor section of the conventional system which does not include the leakage resistor R1.

As shown in FIG. 4, the air/fuel ratio sensing system of this embodiment is arranged so that the phase angle in the frequency characteristic of the loop transfer function is made equal to zero in the high frequency range, and the phase angle is prevented from approaching $-180°$ in the entire range of frequency. In FIG. 4, g6 and g5 are, respectively, gain line and phase line obtained when the resistance of the leakage resistor R1 is smaller. Gain line g8 and phase line g7 are obtained when the resistance of the leakage resistor R1 is higher.

In this embodiment, it is possible to adjust the frequency characteristic of the air/fuel ratio sensing system so that, in the entire frequency range, the phase angle is kept away from $-180°$, and the phase angle does not reach $-180°$. Therefore, the amplification factor of the controller section can be increased to improve the response without sacrificing the stability of the system. Thus, the present invention makes it possible to obtain the air/fuel ratio sensing system which is exempt from oscillation, superior in response, and capable of reducing the system deviation to a low level.

A second embodiment of the present invention is shown in the equivalent diagram of FIG. 5. In the second embodiment, the negative electrode 10b of the oxygen pump cell element 10 and the negative electrode 11b of the oxygen concentration cell element 11 are short circuited by a conductor 25 of platinum or other conducting material, and the resistance of a conductor of a lead 26 is used in place of the leakage resistor R1.

The air/fuel ratio sensing system of the second embodiment has the same advantages as the first embodiment. The arrangement of the second embodiment is well adapted to the air/fuel ratio sensor.

What is claimed is:

1. A control system comprising;

a controlled element having a lag reaching 180° C., said controlled element having input and output terminals, a controller element having an input terminal connected with the output terminal of said controlled element, and an output terminal connected with the input terminal of said controlled element, and leakage means for causing a predetermined amount determined from an input signal of said controlled element to leak to an output signal of said controlled element so as to prevent a phase lag in a frequency characteristic of a loop transfer function of said controlled element and said controller element from becoming equal to or greater than 180° in an entire frequency range.

2. A control system according to claim 1 wherein said controller element produces a current output signal, said controlled element produces a voltage output signal, and said leakage means comprises a leakage element having a predetermined resistance, said leakage element being connected with said controller element so that said current output signal of said controller element flows through said leakage element and develops a voltage drop across said leakage element, said leakage element being further connected with said controlled element so that a voltage equal to said voltage drop is added to said voltage output signal of said controlled element.

3. A control system according to claim 2 wherein said controlled element comprises a sensing element for sensing an oxygen concentration in a gas mixture, and an oxygen pump element which receives said current output signal of said controller element.

4. A control system according to claim 3 wherein said sensing element and said oxygen pump element each comprises an oxygen ion conductive solid electrolyte member, and positive and negative electrodes, said positive electrode of said sensing element being connected to said input terminal of said controller element, said positive electrode of said oxygen pump element being connected to said output terminal of said controller element, said negative electrodes of said sensing and oxygen pump elements both being connected to a first end of said leakage element, a second end of said leakage element being connected to a third terminal of said controller element.

5. A control method for controlling a controlled element which has a high order lag and which is connected with a controller element to form a closed path, comprising;

a step of producing a controller output signal in accordance with an output signal of the controlled element, and applying said controller output signal to the controlled element, and a step of modifying said output signal of the controlled element in accordance with said controller output signal of the controller element so that a phase angle in a frequency characteristic of a loop transfer fucntion of the controlled and controller elements is prevented from reaching −180° in an entire range of frequency.

* * * * *